United States Patent [19]
Kaiser

[11] Patent Number: 5,279,117
[45] Date of Patent: Jan. 18, 1994

[54] EXHAUST PIPE OF AN INTERNAL-COMBUSTION ENGINE

[75] Inventor: Friedrich W. Kaiser, Weissach, Fed. Rep. of Germany

[73] Assignee: Dr.Ing.h.c.F. Porsche AG, Weissach, Fed. Rep. of Germany

[21] Appl. No.: 906,876

[22] Filed: Jul. 2, 1992

[30] Foreign Application Priority Data

Jul. 4, 1991 [DE] Fed. Rep. of Germany ....... 4122141

[51] Int. Cl.$^5$ .............................................. F10N 3/28
[52] U.S. Cl. ......................................... 60/292; 60/324
[58] Field of Search .................................. 60/292, 324

[56] References Cited

U.S. PATENT DOCUMENTS

| | | | |
|---|---|---|---|
| 1,483,354 | 2/1924 | Kopper | 60/324 |
| 3,043,095 | 7/1962 | Sturtz | 60/292 |
| 3,234,924 | 2/1966 | May | 60/292 |
| 3,406,515 | 10/1968 | Behrens | 60/292 |
| 3,957,447 | 5/1976 | Hanaoka | 60/287 |
| 5,144,796 | 9/1992 | Swars | 422/180 |

FOREIGN PATENT DOCUMENTS

| | | |
|---|---|---|
| 63050631 | 3/1988 | European Pat. Off. . |
| 0378797 | 12/1989 | European Pat. Off. . |
| 68625 | 6/1977 | Japan ...................................... 60/292 |

*Primary Examiner*—Douglas Hart
*Attorney, Agent, or Firm*—Evenson, McKeown, Edwards & Lenahan

[57] ABSTRACT

An exhaust pipe of an internal-combustion engine in which self-regulating throttle element is arranged behind the catalyst. In the warm-up phase of the internal-combustion engine, the throttle element closes off the exhaust pipe almost completely. The resulting increased exhaust back pressure causes a higher mass flow rate of the engine, whereby the exhaust gas temperature rises and the catalyst is warmed up rapidly.

16 Claims, 2 Drawing Sheets

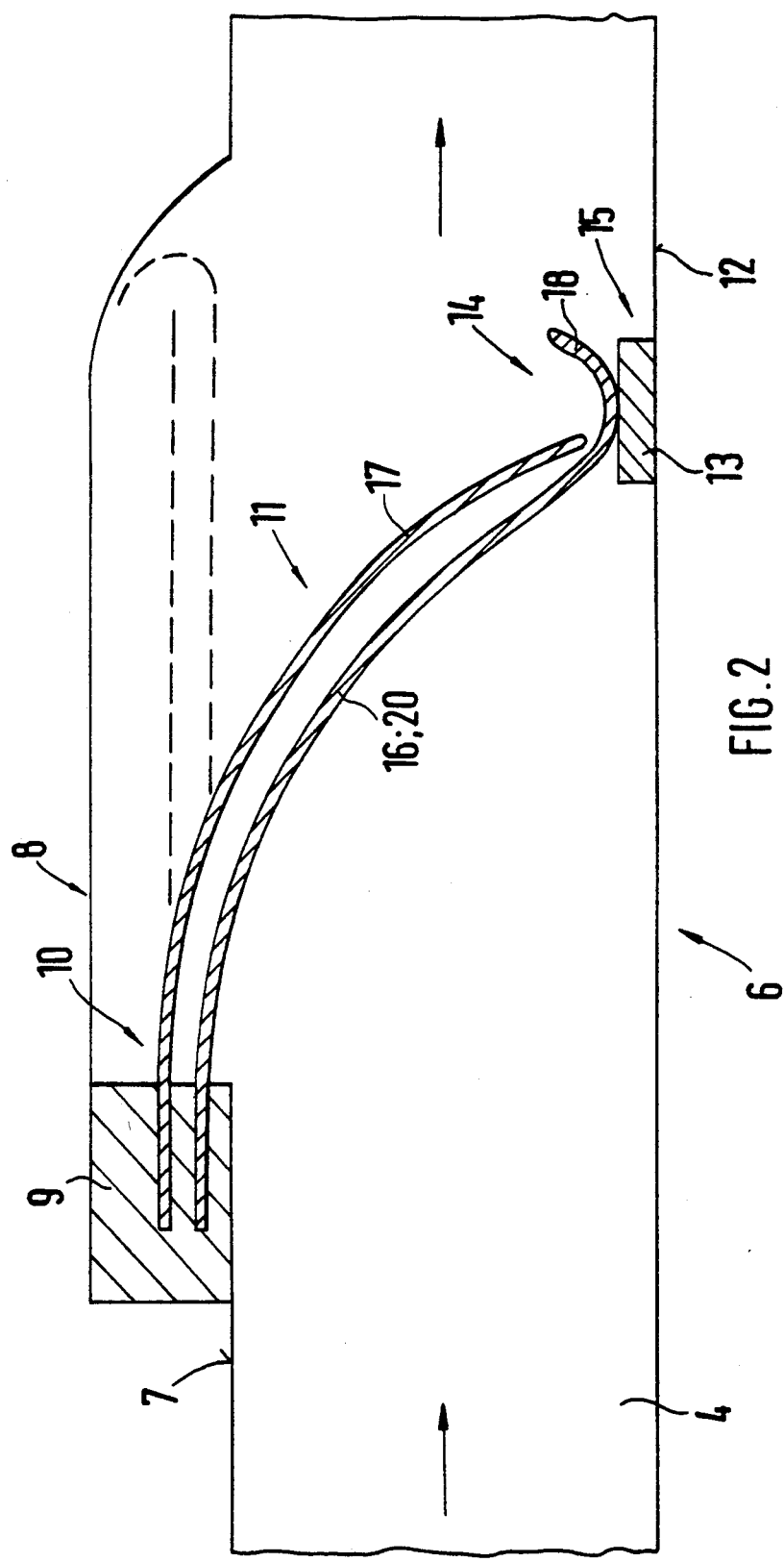

EXHAUST PIPE OF AN INTERNAL-COMBUSTION ENGINE

BACKGROUND AND SUMMARY OF THE INVENTION

The present invention relates to an exhaust pipe of an internal-engine, having at least one catalyst in the exhaust pipe and at least one adjustable throttle element in the exhaust pipe.

From the German Patent Document DE-OS 23 21 578, a throttle element made of bimetal for the exhaust pipe of an internal-combustion engine is known which, when the exhaust gas temperature is low, opens up the full cross-section of an exhaust gas pipe and, when the temperatures are higher, swivels a damming element into the exhaust gas flow. By means of this arrangement, a faster heating of the core zone of the catalyst after the start of the internal-combustion engine is achieved as well as a uniform durability-increasing action on the catalyst after it has reached its working temperature.

An object of the invention is to provide an exhaust pipe of an internal-combustion engine comprising a catalyst in which the catalyst, after the starting of the internal-combustion engine, reaches its working temperature as fast as possible.

This and other objects are achieved by the present invention which provides an exhaust pipe of an internal-combustion engine. This exhaust pipe includes at least one catalyst arranged in the exhaust pipe and one adjustable throttle element arranged in this exhaust pipe. The throttle element has an upstream stationary end adjacent to a first side wall of the exhaust pipe, and a downstream, movable end. The throttle element is positioned such that when the internal-combustion engine is cold, the movable end forms a gap with a second side wall opposite to the first side wall.

By arranging a throttle element in the exhaust pipe which, when the internal-combustion engine is cold, reduces the cross-section of the exhaust pipe down to a residual gap, the exhaust back pressure is increased. For compensating this increased back pressure, the mass flow rate of the engine is increased, whereby the exhaust gas temperature rises and the catalyst reaches its working temperature faster. The throttle element may be constructed as a bimetal or a memory metal and, with its upstream stationary end, is arranged adjacent to a side wall of the exhaust pipe. In the cold condition, the downstream free end forms a gap with the opposite side wall. In the cold state, the throttle element thus blocks the exhaust pipe down to the gap required for the flowing-off of the exhaust gas quantity occurring in the cold start phase. As the internal-combustion engine warms up, the exhaust gas temperature increases, whereby the throttle element deforms and in this case progressively opens up the whole cross-section of the exhaust pipe. The elasticity of the throttle element is designed such that, in the case of a cold start and an immediate high load, the exhaust gas flow lifts the throttle element thus enlarging the gap.

Advantageously, the arrangement of the present invention is self-regulating so that no sensors or control elements are required. It has a simple maintenance-free construction and is preferably arranged downstream of the catalyst, whereby the catalyst is warmed up in an optimally short time.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic sectional view of a part of the exhaust pipe according to FIG. 1.

DETAILED DESCRIPTION OF THE DRAWINGS

Figure 1:
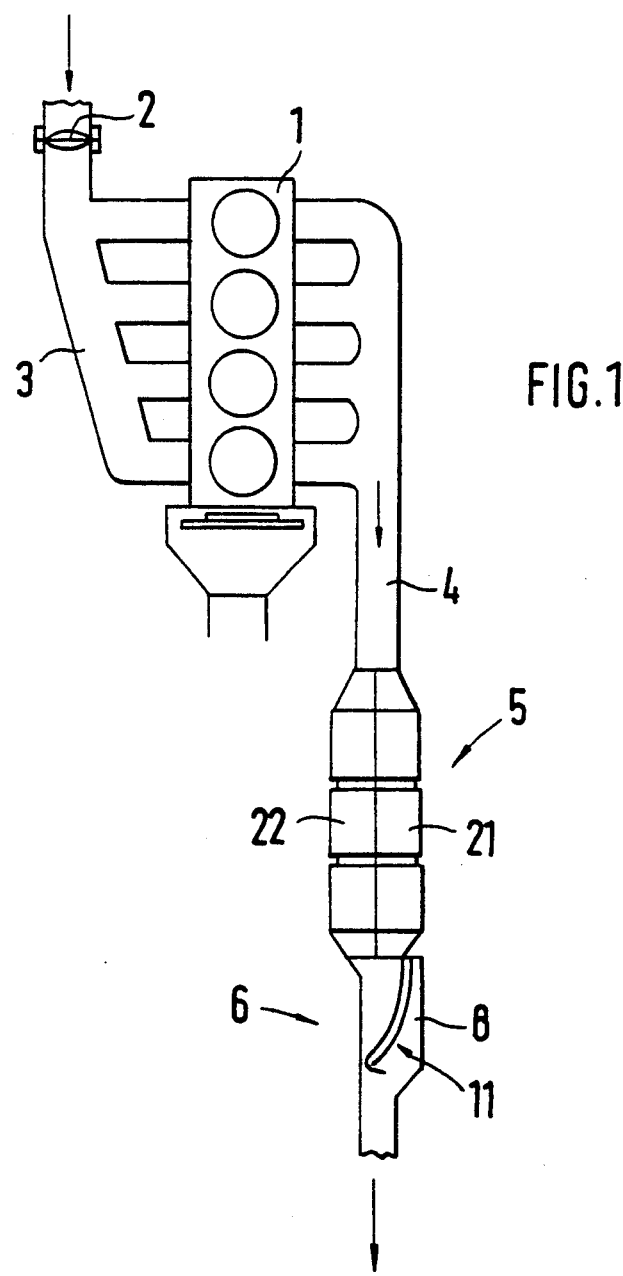
FIG. 1 is a schematic view of an exhaust pipe constructed in accordance with an embodiment of the present invention on an internal-combustion engine.

An internal-combustion engine 1 has an intake air distributor 3 controlled by a throttle valve 2, and an exhaust pipe 4 with a catalyst 5. The flow direction of the exhaust gases is illustrated by directional arrows. Downstream of the catalyst 5, a section 6 of the otherwise circular exhaust pipe 4 has a rectangular construction. Adjacent to a side wall 7, this section 6 has a bulging-out 8, in the upstream end of which a holding device 9 is arranged (FIG. 2).

The holding device 9 accommodates a stationary end 10 of a throttle element constructed, for example, as a bimetallic plate 11 which extends from the holding device 9 to an opposite side wall 12, while almost completely closing the exhaust pipe 4. On the side wall 12, a stop 13 is arranged on which the downstream movable end 14 rests. The stop 13 leaves a gap 15 between the end 14 and the side wall 12 so that a minimal cross-section of the exhaust pipe 4 remains open around the step 13.

The bimetallic plate 11 is formed of two metal strips 16, 17 which are fastened in the holding device 9 at a distance from one another. At the end 14, a pocket 18, in which metal strip 17 is guided, is molded onto metal strip 16.

Immediately after the start of the internal-combustion engine 1, the exhaust gas temperature is relatively low, and the free end 14 of the bimetallic plate 11 is in the starting position indicated in FIG. 2. The exhaust gas flow acts upon the catalyst 5 in an undisturbed manner and warms it up relatively rapidly. This warm-up time is shortened by the position of the bimetallic plate 11 since, as a result of the almost complete blocking of the exhaust pipe 4, the exhaust back pressure is high for the internal-combustion engine 1. This leads to an increased internal exhaust gas recirculation in the overlapping times of the intake and exhaust valves of the charge cycle system and thus to a reduction of pollutants in the warm-up phase of the internal-combustion engine.

For the compensation of the increased exhaust back pressure, the mass flow rate of the engine is increased in a known manner, for example, by an intervention at the throttle valve 2 or an idling adjusting device which is not shown. The increased flow rate leads to a faster warming-up of the internal-combustion engine and thus to a reduction of pollutants. It also causes the exhaust gas temperature and the exhaust gas mass flow rate to increase. The rising temperature rapidly warms up the catalyst 5 as well as the bimetallic plate 11 so that the free end 14 of the bimetallic plate 11 lifts off the stop 13 and moves into the end position indicated by an interrupted line in FIG. 2. This movement is promoted by the exhaust gas flow.

Instead of the metal strips 16, 17, a memory metal 20 may be used which, when a certain temperature is reached, abruptly tilts from the starting position into the end position. When there is a falling-below of this temperature, the memory metal 20 tilts back into the starting position.

For example, in the case of unfavorable installation conditions, section 6 may be arranged in front of the catalyst. In this case, a fast heating of the throttle element takes place since it is acted upon directly by the exhaust gas flow. The holding device 9 may be integrated in a half shell 21 in the housing of the catalyst 5 which is, for example, constructed of two half shells 21, 22.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An exhaust pipe of an internal-combustion engine, comprising at least one catalyst arranged in the exhaust pipe and one adjustable throttle element arrangement in this exhaust pipe, wherein the throttle element has an upstream stationary end adjacent to a first side wall of the exhaust pipe, and a downstream, movable end, with a gap between the movable end and a second side wall opposite to the first side wall when the internal-combustion engine is cold.
   wherein the first side wall has a bulging-out with a holding device attached to the bulging-out, the throttle element being held at the stationary end by the holding device.

2. An exhaust pipe of an internal-combustion engine, comprising at least one catalyst arranged in the exhaust pipe and one adjustable throttle element arrangement in this exhaust pipe, wherein the throttle element has an upstream stationary end adjacent to a first side wall of the exhaust pipe, and a downstream, movable end, with a gap between the movable end and a second side wall opposite to the first side wall when the internal-combustion engine is cold.
   wherein the throttle element includes a bimetallic plate that comprises metal strips, with one metal strip having a molded-on pocket at the movable end for guiding the other metal strip.

3. An exhaust pipe of an internal-combustion engine, comprising at least one catalyst arranged in the exhaust pipe and one adjustable throttle element arrangement in this exhaust pipe, wherein the throttle element has an upstream stationary end adjacent to a first side wall of the exhaust pipe, and a downstream, movable end, with a gap between the movable end and a second side wall opposite to the first side wall when the internal-combustion engine is cold.
   wherein the throttle element includes a bimetallic plate that comprises metal strips which are arranged in a physically separate manner, with one metal strip having a molded-on pocket at the movable end for the guiding of the other metal strip.

4. An exhaust pipe according to claim 2, wherein the throttle element is downstream of the catalyst.

5. An exhaust pipe of an internal-combustion engine, comprising at least one catalyst arranged in the exhaust pipe and one adjustable throttle element arrangement in this exhaust pipe, wherein the throttle element has an upstream stationary end adjacent to a first side wall of the exhaust pipe, and a downstream, movable end, with a gap between the movable end and a second side wall opposite to the first side wall when the internal-combustion engine is cold,
   further comprising a housing of the catalyst, said housing comprising half shells with a holding device for the throttle element being integrated in one of said half shells.

6. An exhaust pipe according to claim 2, wherein the gap is formed by a stop arranged on the side wall.

7. An exhaust pipe according to claim 2, wherein the exhaust pipe in the area of the throttle element has a rectangular cross-section.

8. An exhaust pipe according to claim 2, wherein the throttle element is downstream of the catalyst.

9. An exhaust pipe according to claim 2, wherein the gap is formed by a stop arranged on the side wall.

10. An exhaust pipe according to claim 2, wherein the exhaust pipe in the area of the throttle element has a rectangular cross-section.

11. An exhaust pipe according to claim 3, wherein the throttle element is downstream of the catalyst.

12. An exhaust pipe according to claim 3, wherein the gap is formed by a stop arranged on the side wall.

13. An exhaust pipe according to claim 3, wherein the exhaust pipe in the area of the throttle element has a rectangular cross-section.

14. An exhaust pipe according to claim 5, wherein the throttle element is downstream of the catalyst.

15. An exhaust pipe according to claim 5, wherein the gap is formed by a stop arranged on the side wall.

16. An exhaust pipe according to claim 5, wherein the exhaust pipe in the area of the throttle element has a rectangular cross-section.

* * * * *